US010744429B2

(12) United States Patent
Oz et al.

(10) Patent No.: US 10,744,429 B2
(45) Date of Patent: Aug. 18, 2020

(54) SHEAF-BASED FLUID FILTER (71) Applicant: MAAGAN DESALINATION LTD., D.N. Menashe (IL)

(72) Inventors: Nir Oz, D.N. Misgav (IL); David Zur, Zichron Ya'akov (IL)

(73) Assignee: MAAGAN DESALINATION LTD., Ma'agan Michael (IL)

(*) Notice: Subject to any disclaimer, the term of this patent is extended or adjusted under 35 U.S.C. 154(b) by 726 days.

(21) Appl. No.: 14/917,617

(22) PCT Filed: Sep. 9, 2014

(86) PCT No.: PCT/IL2014/050800
§ 371 (c)(1),
(2) Date: Mar. 9, 2016

(87) PCT Pub. No.: WO2015/033348
PCT Pub. Date: Mar. 12, 2015

(65) Prior Publication Data
US 2016/0220930 A1 Aug. 4, 2016

(30) Foreign Application Priority Data

Sep. 9, 2013 (GB) .................................. 1316007.2

(51) Int. Cl.
*B01D 35/10* (2006.01)
*B01D 29/74* (2006.01)
(Continued)

(52) U.S. Cl.
CPC ............. *B01D 35/10* (2013.01); *B01D 29/50* (2013.01); *B01D 29/66* (2013.01); *B01D 29/74* (2013.01); *B01D 2201/02* (2013.01)

(58) Field of Classification Search
None
See application file for complete search history.

(56) References Cited

U.S. PATENT DOCUMENTS 459,254 A * 9/1891 McAuley ................ B05B 14/46
261/8
605,234 A * 6/1898 Sherk ...................... F21V 17/00
362/379
(Continued)

FOREIGN PATENT DOCUMENTS

| CN | 87100467 | 8/1988 |
| CN | 202666490 | 7/2012 |

(Continued)

OTHER PUBLICATIONS

S. Mauchauffee et al. "Application of 3FM® technology to Pulp and Paper Waste Water Filtration", Veolia Environnement Recherche & Innovation, Jun. 15, 2010.
(Continued)

*Primary Examiner* — Robert J Popovics
(74) *Attorney, Agent, or Firm* — The Roy Gross Law Firm, LLC; Roy Gross (57) ABSTRACT A thread-based filter having a thread-based medium including multiple threads and a tube, the tube at least partially housing the thread-based medium with the threads oriented lengthwise along the length of the tube and the thread-based medium is configured to trap impurities present in a fluid flowing substantially lengthwise along the threads during a filtration mode, and the thread-based medium is configured to release impurities into a fluid flowing substantially lengthwise along the threads during a washing mode.

13 Claims, 10 Drawing Sheets (51) Int. Cl.
*B01D 29/50* (2006.01)
*B01D 29/66* (2006.01)

(56) References Cited

U.S. PATENT DOCUMENTS

| | | | | | |
|---|---|---|---|---|---|
| 741,210 A | * | 10/1903 | Young | | B01D 46/28 160/371 |
| 1,833,315 A | * | 11/1931 | Burhans | | B01D 35/10 139/391 |
| 1,991,847 A | * | 2/1935 | Durgen | | B01D 35/10 210/350 |
| 1,995,651 A | * | 3/1935 | Rathbun | | B01D 46/0065 55/294 |
| 2,054,809 A | * | 9/1936 | Fleisher | | F24F 6/04 159/13.1 |
| 2,076,980 A | * | 4/1937 | Cooper | | B01D 39/083 210/502.1 |
| 2,091,917 A | * | 8/1937 | Fenske | | B01D 11/043 196/14.52 |
| 2,209,180 A | * | 7/1940 | Von Pentz | | B01D 27/005 210/484 |
| 2,945,557 A | * | 7/1960 | Powers | | B01D 35/10 210/499 |
| 3,016,345 A | * | 1/1962 | Price | | B01D 17/045 134/10 |
| 3,018,845 A | * | 1/1962 | Powers | | B01D 39/086 210/499 |
| 3,019,186 A | * | 1/1962 | Powers | | B01D 35/10 210/499 |
| 3,024,518 A | * | 3/1962 | Newton | | D03D 27/00 112/410 |
| 3,062,379 A | * | 11/1962 | Bryan | | C08J 5/2287 210/499 |
| 3,219,194 A | * | 11/1965 | Schwartzwalder | | B01D 24/008 210/500.1 |
| 3,238,124 A | * | 3/1966 | Burton | | C02F 3/06 210/150 |
| 3,246,767 A | * | 4/1966 | Pall | | B01D 29/111 210/505 |
| 3,306,454 A | * | 2/1967 | Webb | | B01D 35/10 210/172.3 |
| 3,407,935 A | * | 10/1968 | Burton | | C02F 3/06 209/350 |
| 3,527,351 A | * | 9/1970 | Wade | | B01D 29/216 210/356 |
| 3,622,446 A | * | 11/1971 | Burnham | | B01D 39/04 156/62.2 |
| 3,627,677 A | * | 12/1971 | Dyrud | | A47J 43/284 210/649 |
| 3,631,987 A | * | 1/1972 | Cattano, Sr. | | B01D 29/23 210/452 |
| 3,673,048 A | * | 6/1972 | Gidge | | D04H 11/00 156/510 |
| 3,754,377 A | * | 8/1973 | Clonts | | B01D 47/025 95/211 |
| 3,758,404 A | * | 9/1973 | Clonts | | B01D 11/0449 208/263 |
| 3,794,583 A | * | 2/1974 | Rhodes | | B01D 17/0202 210/300 |
| 3,839,487 A | * | 10/1974 | Clonts | | B01J 14/00 585/723 |
| 3,861,881 A | * | 1/1975 | Nowak | | F01N 3/2853 138/108 |
| 3,943,221 A | * | 3/1976 | Schladitz | | B01F 3/04085 261/142 |
| 3,977,829 A | * | 8/1976 | Clonts | | B01D 11/0449 422/256 |
| 3,977,847 A | * | 8/1976 | Clark | | B01D 46/0067 95/279 |
| 3,989,466 A | * | 11/1976 | Pan | | B01D 11/043 422/257 |
| 3,992,156 A | * | 11/1976 | Clonts | | B01D 11/0449 422/256 |
| 4,090,965 A | * | 5/1978 | Fuchs | | B01D 33/067 210/151 |
| 4,167,482 A | * | 9/1979 | Muller | | B01D 35/10 210/411 |
| 4,219,420 A | * | 8/1980 | Muller | | B01D 35/10 210/411 |
| 4,284,507 A | * | 8/1981 | Beane | | B01D 39/083 112/10 |
| 4,288,321 A | * | 9/1981 | Beane | | E02B 11/005 210/170.07 |
| 4,294,694 A | * | 10/1981 | Coulthard | | C02F 3/103 210/150 |
| 4,322,232 A | * | 3/1982 | Beane | | B01D 39/083 210/243 |
| 4,416,782 A | * | 11/1983 | Kerres | | B01D 17/045 210/483 |
| 4,418,432 A | * | 12/1983 | Vidal | | A47K 1/14 210/163 |
| 4,422,930 A | * | 12/1983 | Hatanaka | | C02F 3/06 210/150 |
| 4,451,362 A | * | 5/1984 | Spelsberg | | C02F 3/10 210/150 |
| 4,491,565 A | * | 1/1985 | Verachtert | | B01D 11/043 196/14.52 |
| 4,640,781 A | * | 2/1987 | Hughes | | B01D 17/045 210/520 |
| 4,662,778 A | * | 5/1987 | Dempsey | | E01C 11/225 210/170.07 |
| 4,666,689 A | * | 5/1987 | Maple | | C10G 19/08 208/235 |
| 4,675,100 A | * | 6/1987 | Maple | | B01J 8/025 208/189 |
| 4,746,494 A | * | 5/1988 | Maple | | B01J 8/025 422/211 |
| 4,753,722 A | * | 6/1988 | Le | | C10G 19/02 208/207 |
| 4,783,259 A | * | 11/1988 | Wade | | B01D 35/10 210/167.12 |
| 4,851,136 A | | 7/1989 | Fanqing et al. | | |
| 4,869,814 A | * | 9/1989 | Hughes | | B01D 17/0211 210/142 |
| 4,886,601 A | | 12/1989 | Iwatsuka et al. | | |
| 4,915,833 A | * | 4/1990 | Iwatsuka | | B01D 35/10 210/321.67 |
| 4,915,835 A | | 4/1990 | Barzuza et al. | | |
| 4,961,464 A | * | 10/1990 | Wollbeck | | B01D 63/02 165/82 |
| 5,006,260 A | * | 4/1991 | Roques | | B01D 17/0208 210/708 |
| 5,085,766 A | * | 2/1992 | Born | | B01D 39/00 210/150 |
| 5,139,686 A | | 8/1992 | Cares | | |
| 5,190,571 A | * | 3/1993 | Fay | | B01D 39/2082 55/523 |
| 5,501,248 A | * | 3/1996 | Kiest, Jr. | | D04B 1/02 138/123 |
| 5,582,744 A | * | 12/1996 | Abel | | B01D 35/18 210/323.2 |
| 5,616,244 A | * | 4/1997 | Seureau | | B01D 17/045 210/295 |
| 5,690,823 A | * | 11/1997 | Reipur | | B01D 35/10 210/321.79 |
| 5,705,074 A | * | 1/1998 | Brient | | B01D 11/043 210/511 |
| 5,961,819 A | * | 10/1999 | Lee | | B01J 8/0257 208/203 |
| 5,984,108 A | * | 11/1999 | Choi | | B01D 29/114 210/350 |
| 5,997,731 A | * | 12/1999 | Suarez | | C10G 19/08 208/203 |
| 5,997,972 A | * | 12/1999 | Basse | | B01J 19/32 156/250 |
| 6,090,275 A | | 7/2000 | Cheng | | |
| 6,103,132 A | * | 8/2000 | Seyfried | | B01D 33/073 210/791 |

(56) References Cited

U.S. PATENT DOCUMENTS

| | | | | |
|---|---|---|---|---|
| 6,126,819 | A * | 10/2000 | Heine | B01D 63/024 210/139 |
| 6,165,244 | A | 12/2000 | Choi | |
| 6,508,942 | B2 * | 1/2003 | Morimura | B01D 35/10 210/483 |
| 6,616,840 | B1 * | 9/2003 | Boele | B01D 33/067 210/297 |
| 6,776,295 | B2 * | 8/2004 | Morimura | B01D 35/10 210/489 |
| 7,104,530 | B2 * | 9/2006 | Boye | B01D 39/04 261/94 |
| 7,198,718 | B1 * | 4/2007 | Turnbull | B01D 17/045 210/232 |
| 7,207,445 | B2 * | 4/2007 | Manna | B01D 11/0449 208/203 |
| 7,223,347 | B2 * | 5/2007 | Boner | B01D 24/005 210/795 |
| 7,282,155 | B2 * | 10/2007 | Boye | B01D 35/10 210/350 |
| 7,344,035 | B1 * | 3/2008 | Koopmann | D04B 1/04 210/503 |
| 7,442,295 | B2 * | 10/2008 | Cheng | C02F 3/04 210/151 |
| 7,544,286 | B2 * | 6/2009 | Tharp | A01K 63/04 119/227 |
| 7,618,544 | B2 * | 11/2009 | Massingill, Jr. | B01D 11/0449 210/749 |
| 7,731,852 | B2 * | 6/2010 | Monosov | C02F 3/103 210/150 |
| 7,927,394 | B2 * | 4/2011 | MacKenzie | B01D 46/0031 55/392 |
| 8,128,825 | B2 * | 3/2012 | Massingill | B01D 11/0449 210/638 |
| 8,221,618 | B2 * | 7/2012 | Murray | B01D 29/15 210/108 |
| 8,287,726 | B2 * | 10/2012 | Williams | B01D 35/10 210/108 |
| 8,308,957 | B2 * | 11/2012 | Zhang | B01D 11/0453 423/183 |
| 8,562,835 | B2 | 10/2013 | Frye et al. | |
| 8,574,429 | B2 * | 11/2013 | Zhang | C10G 19/02 208/230 |
| 8,640,883 | B2 * | 2/2014 | Doig | B01D 29/114 210/483 |
| 8,852,445 | B2 * | 10/2014 | Xia | B01D 29/39 210/333.01 |
| 8,937,196 | B2 * | 1/2015 | Fosdick | B01D 11/04 556/466 |
| 9,168,469 | B2 * | 10/2015 | Massingill | B01J 19/2495 |
| 9,221,000 | B2 * | 12/2015 | Doig | B01D 29/114 |
| 9,468,866 | B2 * | 10/2016 | Massingill | B01D 11/0449 |
| 9,815,001 | B2 * | 11/2017 | Massingill | B01D 11/0449 |
| 10,189,806 | B2 * | 1/2019 | Massingill | B01J 19/2495 |
| 2002/0033371 | A1 * | 3/2002 | Morimura | B01D 35/10 210/798 |
| 2003/0080072 | A1 * | 5/2003 | Morimura | B01D 35/10 210/767 |
| 2003/0178366 | A1 | 9/2003 | Boye | |
| 2006/0157411 | A1 * | 7/2006 | Massingill | B01D 11/0449 210/639 |
| 2006/0260996 | A1 * | 11/2006 | Brownstein | B01D 39/04 210/242.4 |
| 2008/0260465 | A1 * | 10/2008 | Hurst | B01D 21/0006 405/87 |
| 2010/0071260 | A1 * | 3/2010 | Massingill | B01D 11/0449 44/388 |
| 2011/0011790 | A1 * | 1/2011 | Doig | B01D 29/114 210/393 |
| 2012/0085695 | A1 * | 4/2012 | Saxena | B82Y 30/00 210/491 |
| 2014/0299553 | A1 * | 10/2014 | Dubois | B01D 35/10 210/747.3 |
| 2015/0367267 | A1 * | 12/2015 | Lef Vre | B01D 35/10 426/490 |
| 2016/0059156 | A1 * | 3/2016 | Dannemann | B01D 29/684 210/791 |
| 2016/0220930 | A1 * | 8/2016 | Oz | B01D 35/10 |

FOREIGN PATENT DOCUMENTS

| | | | |
|---|---|---|---|
| DE | 202008009426 | 7/2007 | |
| EP | 0280052 | 8/1988 | |
| EP | 0488992 | 3/1992 | |
| EP | 0667801 | 8/1995 | |
| GB | 2517985 B * | 1/2016 | B01D 35/10 |
| JP | 2012196592 | 10/2012 | |
| KR | 20100005780 U | 6/2010 | |
| WO | 2002024306 | 3/2002 | |
| WO | 2004067136 | 8/2004 | |
| WO | 2005084776 | 9/2005 | |
| WO | 2005113110 | 12/2005 | |
| WO | 2005113111 | 12/2005 | |
| WO | 2013122464 | 8/2013 | |
| WO | 2015033348 | 3/2015 | |
| WO | WO-2015033348 A1 * | 3/2015 | B01D 29/66 |

OTHER PUBLICATIONS

Fibax Filter; http://www.stowa-selectedtechnologies.nl/Sheets/Sheets/Fibax.Filter.html; Published on Jun. 13, 2006; Last accessed Jan. 31, 2017.

Fibrotex® [Brochure]. (n.d.) pp. 1-4, Camberley, Surrey.

* cited by examiner

SHEAF-BASED FLUID FILTER

FIELD OF THE INVENTION

The invention relates to the field of fluid filters.

BACKGROUND

Fluid filters are designed to remove solid or other impurities from a fluid (liquid and/or gas) by means of a porous physical barrier. The physical barrier is often referred to as the "filter medium". Many types of filter media exist. Some filter media are compressible, allowing an adjustment of the size and/or shape of their pores, thereby enabling the removal of impurities of different sizes and/or shapes. Other filter media remove impurities by means of interception and causing adherence of the particles, requiring water to flow flows at a relatively slow rate.

In addition to their filtering mode of operation, fluid filters are often also configured to be operated in a washing mode. In the washing mode, a fluid is streamed in the opposite direction to the filtering direction, thereby washing away the impurities previously caught in the filter medium. In some cases, the media may be expanded before or during the washing, thereby allowing the caught impurities to escape from the pores into the washing fluid.

One common type of fluid filters is a water filter. Water filters are used, for example, in water treatment plants, desalination plants, and points-of-use, such as residential or commercial sites. These filters may filter water intended for drinking, irrigation and/or industrial purposes, removing impurities ranging from dirt to pathogens.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, a thread-based filter, comprising: a thread-based medium comprising multiple threads; and a tube comprising a first opening and a second opening, wherein the tube at least partially houses the thread-based medium, the medium having a first end oriented towards the first opening and a second end oriented towards the second opening, wherein the threads are oriented lengthwise along the length of the tube and extend between the first and second ends of the medium, and wherein the thread-based medium is configured to trap impurities present in a fluid flowing substantially lengthwise along the threads from the first opening to the second opening during a filtration mode, and wherein the thread-based medium is configured to release impurities into a fluid flowing substantially lengthwise along the threads from the second opening to the first opening during a washing mode.

In some embodiments, the threads at the second end of the medium are attached to a plate, and wherein the threads at the first end of the medium are unattached, thereby providing a smaller inter-thread spacing during the filtering mode and providing a greater inter-thread spacing during the washing mode.

In some embodiments, the medium is tapered towards the second end of the medium.

In some embodiments, the plate provides a passageway for the fluid.

In some embodiments, the medium is configured to move lengthwise along the tube.

In some embodiments, the motion of the medium lengthwise along the tube is configured to provide a varying inter-thread spacing within the medium.

In some embodiments, the tube comprises a narrow portion and a wide portion.

In some embodiments, the thread based medium is housed in the narrow portion during the filtration mode, and wherein the at least a portion of the medium adjacent to the first end of the medium is housed in the wide portion of the tube during the washing mode.

In some embodiments, the thread based medium is at least partially contained within the tube during the filtration mode, and wherein at least a portion of the medium adjacent to the first end of the medium is exposed from the tube during a washing mode.

In some embodiments, the fluid is any of water, air or a combination of water and air during a washing mode.

In some embodiments, the fluid is introduced to the medium as a continuous stream during a washing.

In some embodiments, the fluid is introduced to the medium as a pulse during a washing mode There is further provided, in accordance with an embodiment, a multi-sheaf-based filter, comprising: multiple sheaf-based filter units; and a filter body, wherein the filter body is configured to house the multiple sheaf-based filter units.

In some embodiments, the sheaf-based filter units each comprise the thread-based filter.

In some embodiments, the multi-sheaf-based filter further comprises: a filtering input port; a filtering output port; a washing input port; and a washing output port, wherein the multi-sheaf based filter is configured to receive a filtration fluid at the filtering input port, direct the filtration fluid into the multiple sheaf-based filter units to flow lengthwise along the threads of the units, and remove the filtration fluid via the filtering output port, thereby filtering the filtration fluid, and receive a washing fluid at the washing input port, direct the washing fluid into the multiple sheaf-based filter units to flow lengthwise along the threads of the units, and remove the washing fluid via the washing output port, thereby washing the filter.

In some embodiments, the filter is configured to direct the fluid into the units simultaneously.

In some embodiments, the filter is configured to direct the fluid into the units sequentially.

There is further provided, in accordance with an embodiment, a method for filtering a fluid, the method comprising: introducing a fluid into a thread-based medium comprising multiple threads extending between a first end and a second end of the medium, wherein the medium is at least partially housed in a tube, and wherein the threads of the medium are oriented lengthwise along the length of the tube with the first end of the medium oriented with a first end of the tube and the second end of the medium oriented with a second end of the tube, directing the fluid to flow lengthwise along the threads from the first end of the medium to the second end of the medium; trapping in the threads impurities present in the fluid, thereby filtering the fluid; and removing the fluid from the second end of the medium.

In some embodiments, directing the fluid to flow from the first end of the medium to the second end of the medium further comprises directing the fluid to flow from the unattached ends of the threads at the first end of the medium to a plate attached to the second end of the medium.

In some embodiments, trapping further comprises pushing the medium lengthwise along the tube, thereby containing the medium within the tube and reducing the inter-thread spacing of the medium.

In some embodiments, the tube has a varying cross-sectional area, and wherein the medium is at least partially contained within a narrower portion of the tube.

In some embodiments, the second end of the medium is tapered.

There is further provided, in accordance with an embodiment, a method for washing a filter, the method comprising: introducing a fluid into a second end of a thread-based medium comprising multiple threads extending between a first end and a second end of the medium, wherein the medium is at least partially housed in a tube, and wherein the threads of the medium are oriented lengthwise along the length of the tube with the first end of the medium oriented with a first end of the tube and the second end of the medium oriented with a second end of the tube, directing the fluid to flow lengthwise along the threads from the second end of the medium to the first end of the medium; releasing impurities trapped in the threads into the fluid, thereby washing the filter; and removing the fluid from the first end of the medium.

In some embodiments, directing further comprises directing the fluid to flow through a plate attached to the second end of the medium to the unattached ends of the threads at the first end of the medium.

In some embodiments, releasing further comprises pushing the medium lengthwise along the tube, thereby exposing at least a portion of the medium adjacent to the first end of the medium from the tube and increasing the inter-thread spacing of the medium.

In some embodiments, releasing further comprises pushing the medium lengthwise along the tube, thereby containing the at least a portion of the medium adjacent to the second end of the medium in a wider portion of the tube and increasing the inter-thread spacing of the medium In some embodiments, the fluid comprises water, or air, or a combination of water and air.

In some embodiments, the fluid is introduced as a continuous stream.

In some embodiments, the fluid is introduced as a pulse.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

A thread-based fluid filter is disclosed herein. In this filter, multiple threads, such as in a sheaf configuration, provide a bi-directional medium for alternate filtering and washing modes. Filtering and washing is achieved by streaming a fluid substantially lengthwise along the threads in opposing directions, accordingly. The term "substantially" refers to the fact that while the majority of the flow may be lengthwise along the threads, some flow may be transverse or lateral to some of the threads, resulting in some cross flow.

Figure 1A:
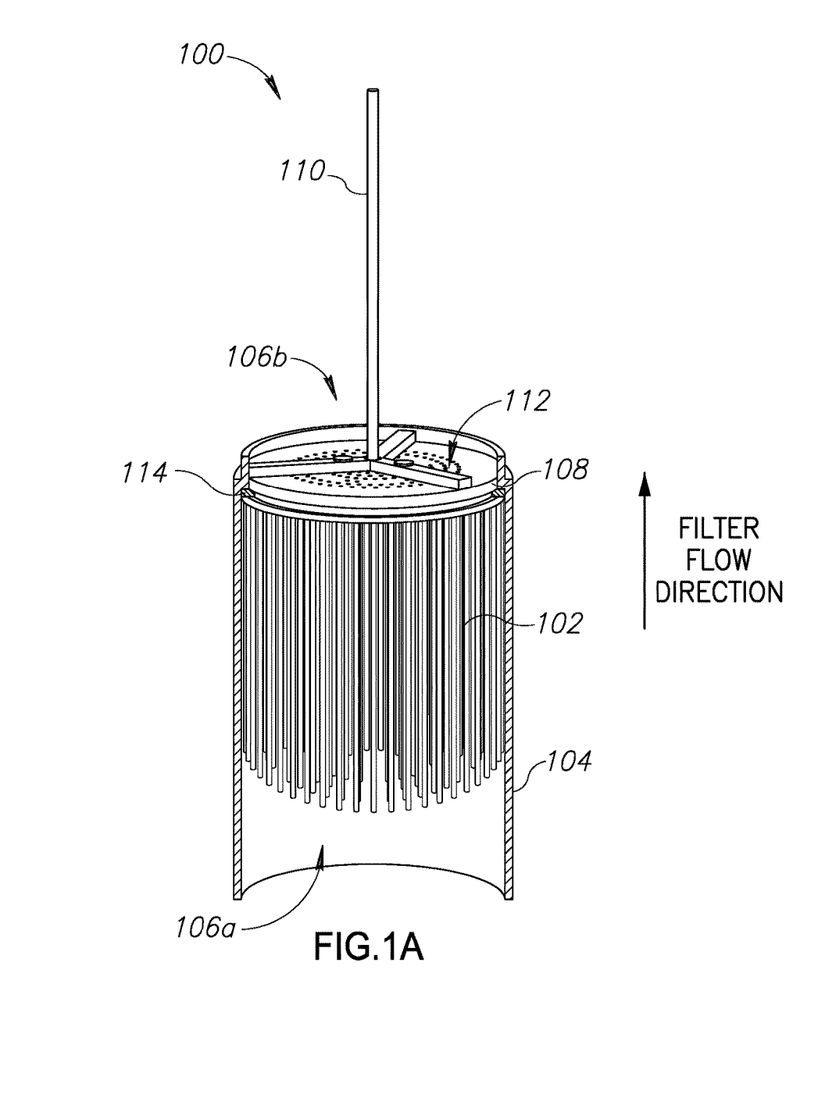
FIG. 1A shows a cross-sectional view of an exemplary sheaf-based filter during a filtration mode, in accordance with an embodiment of the invention.

Reference is now made to FIG. 1A, which shows a cross-sectional view of an exemplary sheaf-based filter 100, in accordance with an embodiment of the invention.

Filter 100 may include a thread-based filtration medium 102 providing multiple threads, such as in a sheaf configuration, where the threads of the medium extend from one end of the medium to the other end. Filter 100 may be configured to remove impurities from a fluid flowing lengthwise along the threads during a filtration mode, and release those impurities into a fluid flowing lengthwise along the threads during a washing mode. The fluid, in accordance with some exemplary embodiments, may be water, air, oil, or combinations thereof, to name a few.

For example, in various embodiments, the number of threads per sheaf is between 120,000 and 130,000. The threads may be mono-filament having a typical diameter ranging between 200-250 microns. Alternatively, the threads may be spun threads, each composed of approximately 70 single mono-filament polyester fibers with typical thread diameters ranging from 200 to 250 microns. A typical filtration unit may have an approximate diameter of 8 cm, and a height of between 10 and 15 cm. However, other sizes of filtration units are intended herein The term "threads", as referred to herein, may relate to any kind of strings, yarns, fabric stripes, etc.—whether having an essentially round cross section, essentially rectangular cross section, etc. The threads may be made of any suitable material, whether rigid or flexible.

Medium 102 may be at least partially housed in a tube 104 disposed with one or more openings 106a and 106b for introducing and removing the fluid. Medium 102 may be oriented in a manner to allow the threads of medium 102 to run lengthwise along the length of tube 104, by orienting one end of medium 102 with opening 106a and orienting the other end of medium 102 with opening 106b, thereby allowing a fluid flowing through the tube to flow lengthwise along the threads of medium 102. In some embodiments, the cross-sectional area of tube 104 may have a circular or elliptical shape. In other embodiments the cross-sectional area of tube 104 may have a polygon shape, such as a hexagon, triangle or square, to name a few.

The threads of medium 102 may be attached at one end, such as by attaching the ends of the threads to a plate, such as a disc 108. Medium 102 may be configured to move lengthwise along tube 102, such as by configuring plate 108 to move lengthwise along tube 102, such as in response to fluid pressure. The threads may be attached to plate 108 using any suitable attachment technique, such as by gluing the threads to plate 108 using any suitable adhesive. Plate 108 may provide one or more passageways for fluid to flow through plate 108, such as one or more perforations. The opposite ends of the threads of medium 102 may be optionally unattached. A rod 110 may be coupled to plate 108 at an end of tube 104 via a bridge 112. Rod 110 may provide a stabilizing axis to plate 108 for lengthwise aligning the motion of plate 108 along tube 104, such as in response to fluid pressure. Optionally, the lengthwise motion of rod 110 for pushing and/or pulling plate 108 along tube 102 may be augmented using any suitable means, such as by applying any combination of mechanical, electric, or pneumatic means to enhance the filtering and washing operations. A seal 114, such as a polymeric seal may be provided to prevent fluid leakage.

The following description discloses multiple modes of use for filter 100, such as a filtering mode and a washing mode. In describing various elements of the system, the terms 'top' and 'bottom' may be understood as identifying opposite ends of the filter, and do not imply any specific orientation of the filter.

During a filtration mode, the fluid may be introduced to medium 102, such as at the unattached and optionally exposed ends of the threads. The fluid may enter from the bottom of tube 104 via opening 106*a*, and flow substantially lengthwise along the threads towards opening 106*b*. The fluid pressure, optionally augmented with electro/mechanical/pneumatic means, may push medium 102 attached to plate 108 along tube 104 until plate 108 engages with the top end of tube 104, pushing medium 102 against plate 108 and at least partially containing medium 102 within tube 104, thereby decreasing the inter-thread spacing within the threads of the medium. Impurities, also referred to as "particles", that are present in the fluid may flow into the spaces between the threads, starting from the free ends of the medium 102 until they reach a location where the space is too tight to accommodate them, and they become trapped in the threads, thereby filtering the fluid. The particles may be trapped in the threads by additional means, such as by interception by the threads, internal impaction, diffusion, or Electro kinetic effects, thereby filtering the fluid. The filtered fluid may flow out of medium 102 through the perforations in plate 108 and exit from the top of tube 104 via opening 106*b*.

Figure 1B:
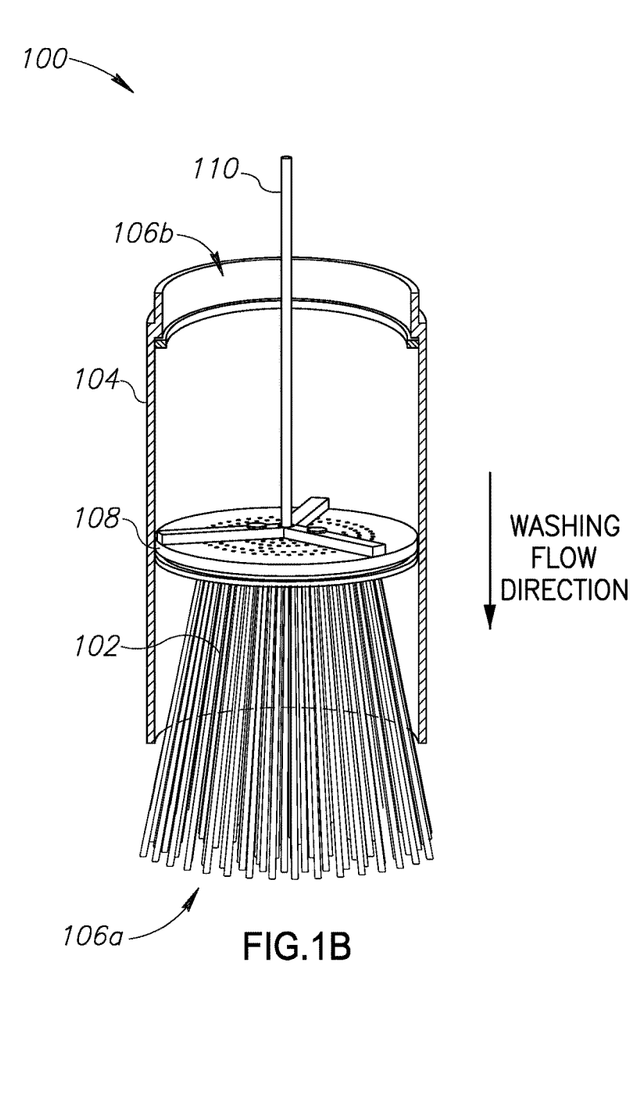
FIG. 1B shows a cross-sectional view of the exemplary sheaf-based filter of FIG. 1A during a filtration mode, in accordance with an embodiment of the invention.

Reference is now made to FIG. 1B, which illustrates the filter of FIG. 1A during an exemplary washing mode. In the example of FIG. 1B, a washing fluid may be introduced to medium 102, such as at the attached ends of the threads of the medium, via opening 106*b* at the top of tube 104. The washing fluid may flow through the perforations of plate 108 substantially lengthwise along the threads of medium 102 in tube 104 towards opening 106*a*. The washing fluid, optionally augmented with electro/mechanical/pneumatic means, may push medium 102 attached to plate 108 lengthwise along tube 104 until a portion of the threads, such as the portion adjacent to the unattached ends of the threads, are exposed from the bottom of tube 104, allowing the threads to separate, and increasing the inter-thread spacing in medium 102. Impurities that were trapped in the threads may be pushed out of medium 102 by the washing fluid and released into the fluid, thereby washing the filter. The washing fluid with the impurities may exit tube 104 via opening 106*a*.

Figure 2A:
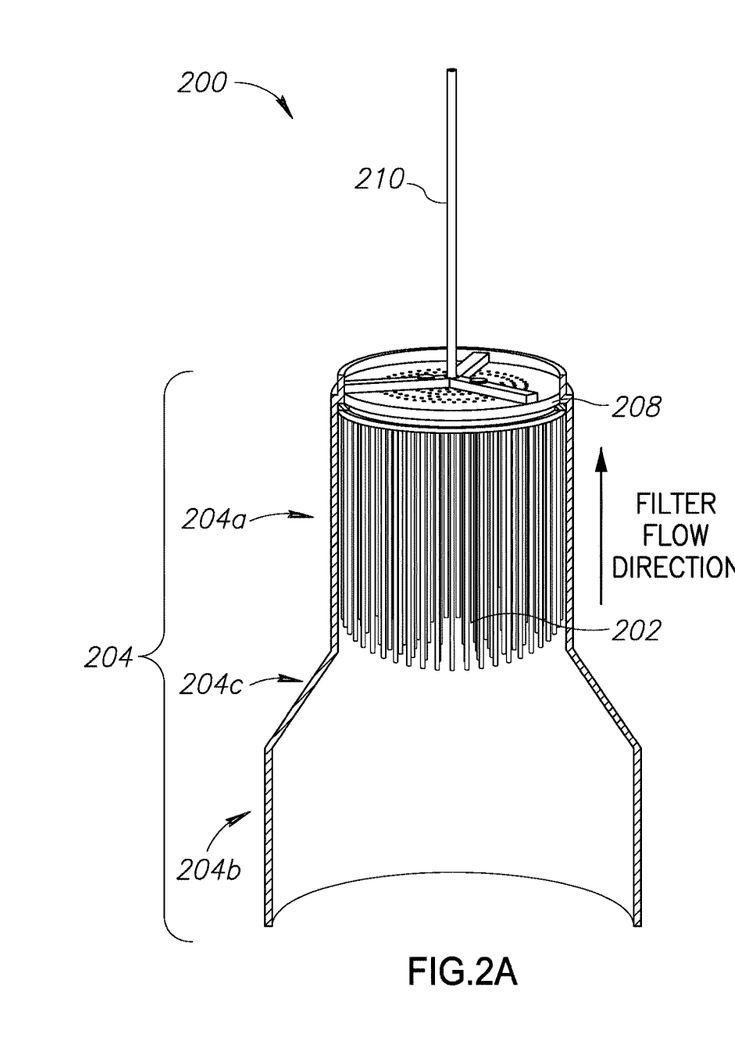
FIG. 2A shows a cross-sectional view of an exemplary sheaf-based filter during a filtration mode, in accordance with another embodiment of the invention.
Figure 2B:
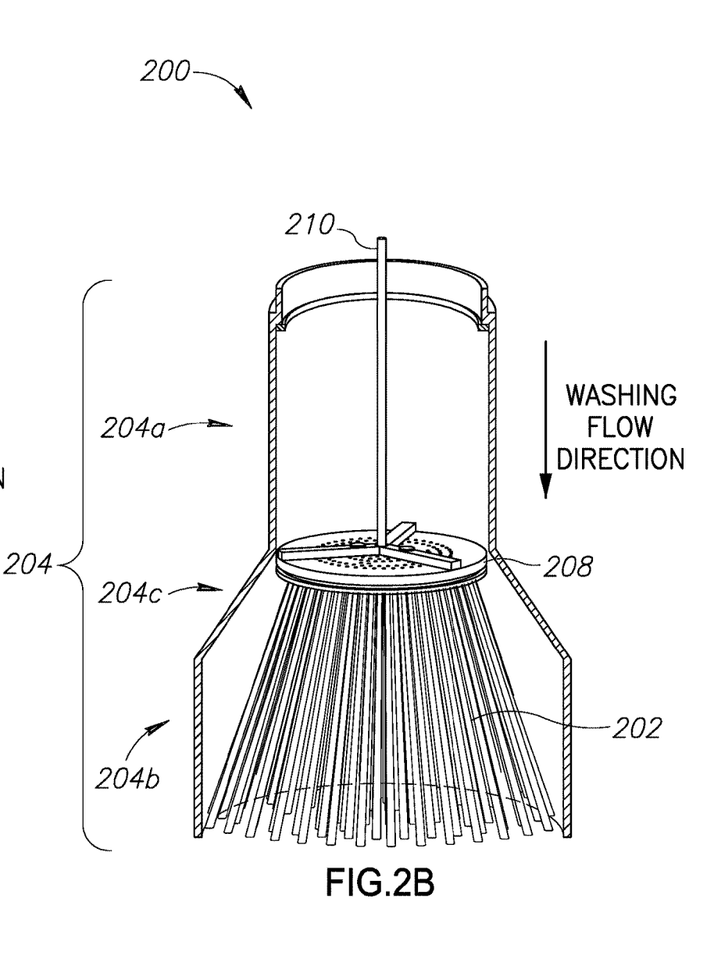
FIG. 2B shows a cross-sectional view of the exemplary sheaf-based filter of FIG. 1B during a filtration mode, in accordance with an embodiment of the invention.

Reference is now made to FIGS. 2A-B, which illustrate an exemplary sheaf-based filter according to another embodiment of the invention. In the example of FIGS. 2A-B, Filter 200 is substantially similar to filter 100 of FIG. 1A with the notable difference that tube 204, corresponding to tube 104 of FIG. 1A, is configured with a tapered geometry providing a varying cross-sectional area along its length, such as by configuring a top portion of tube 204*a* with a narrower cross-sectional area than a wider, bottom portion of tube 204*b*. For example, in some embodiments typical ratios between the cross-sectional areas of portion 204*a* to portion 204*b* may range from 1:15 to 1:1.25, or an increase of between 15% to 25%. Other embodiments may have different ratios between the portions. In one embodiment, narrow tube portion 204*a* and wide tube portion 204*b* may be cylindrical and may connect to each other using any suitable connector, such as with a conical mid-portion 204*c*. The length of narrow tube portion 204*a* may be sufficient to contain the threads of medium 202 within tube portion 204*a* when plate 208 engages with the top of narrow tube portion 204*a*, such as during the filtering mode when the fluid flows lengthwise along the threads of medium 202 from opening 206*a* to opening 206*b*. Advantageously, engaging plate 208 with the top of narrow portion 204*a* causes the threads to become crowded and reduces the inter-thread spacing of medium 102, thereby enhancing the filtering capability of medium 202. The threads of medium 202 may be optionally tapered towards their attachment to plate 208, thereby further reducing the inter-thread spacing when plate 208 engages with the top of tube 204 and enhancing the filtration capability of medium 202.

Reference is now made to FIG. 2B which illustrates the filter of FIG. 2A in a washing mode of operation. Advantageously, the length of tube 204 may be sufficient to contain the threads of medium 202 throughout the washing mode, without exposing any portion of the threads out of tube 204. When plate 208 is pushed lengthwise along tube 204 by the washing fluid, such as during the washing mode when the fluid flows lengthwise along the threads of medium 202 from opening 206*b* to opening 206*a*, optionally augmented with electro/mechanical/pneumatic means, at least a portion of medium 202, such as the portion of the threads that are adjacent to the free, unattached ends of the threads, may be contained within wide tube portion 204*b* causing the threads of medium 202 to separate and increasing the inter-thread spacing, thereby enhancing the washability of medium 202. Impurities that were trapped in the smaller inter-thread spaces may be released into the washing fluid. Advantageously, preventing the exposure of the threads of medium 202 from tube 204 shields and protects them from becoming entangled, such as with other threads.

In some embodiments, multiple cycles, such as the washing cycle, may be performed with filters 100 and 200 using different compositions of fluid, such as performing alternating cycles with water, air, or a combination of water and air. In some embodiments the fluid is introduced into mediums 102 and 202 in pulses, whereas in other embodiments the fluid is introduced as a continuous stream.

Advantageously, by attaching the optionally tapered threads at one end to a plate, and leaving the threads unattached at their other ends, and further providing the plate mobility within either of tubes 104 or 204, a varying inter-thread spacing is provided to the thread medium throughout the usage modes described above, thereby enhancing both the filtering and washing operations. In this manner, in some embodiments a filtration fineness of approximately 1 micron may be achieved. In other embodiments a different filtration fineness may be achieved.

Figure 3A:
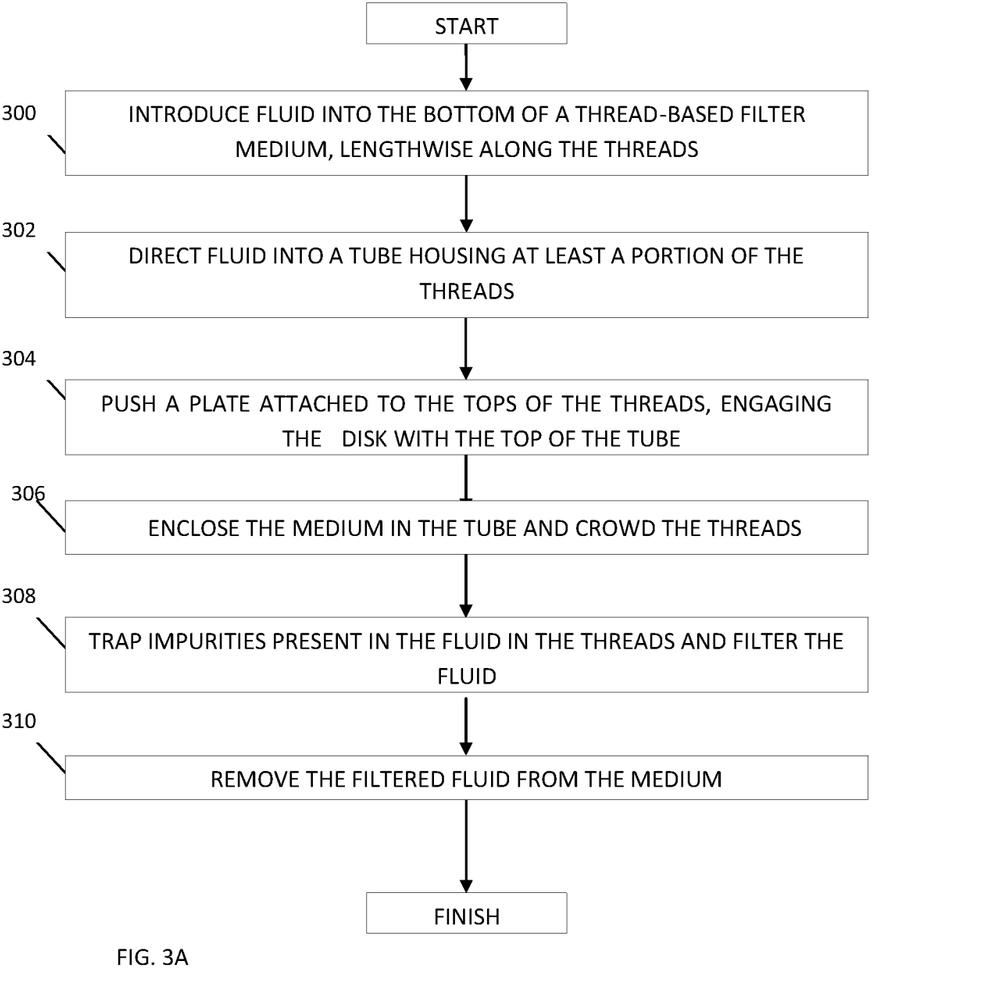
FIG. 3A shows a flowchart of a method for filtering a fluid, in accordance with the filter of FIG. 1A.

Reference is now made to FIG. 3A which is a simplified flowchart of a method for filtering a fluid, in accordance with an embodiment of the invention. In the method of FIG. 3A, a fluid to be filtered may be introduce, such as by pumping the fluid, into the optionally exposed and unattached bottom thread ends of a thread-based medium comprising multiple threads extending from one end of the medium to the other end, to flow substantially lengthwise along the threads of the medium towards the attached ends of the threads (Step 300). The fluid may directed to flow into the bottom of a tube housing at least a portion of the medium with the threads running lengthwise along the length of the tube, where the unattached ends of the medium may be oriented with the bottom of the tube (Step 302). The fluid may push a plate attached to the top ends of the threads and oriented with the top of the tube, lengthwise along the tube, engaging the plate with the top of the tube (Step 304), thereby containing at least a portion of the thread-based medium in the tube and crowding the threads by reducing the inter-thread spacing (Step 306). Impurities present in the fluid may be trapped in the threads, thereby filtering the fluid (Step 308). The filtered fluid may be removed by flowing out of the medium through one or more perforations in the plate, and may exit from the top of the tube via an opening (Step 310).

Figure 3B:
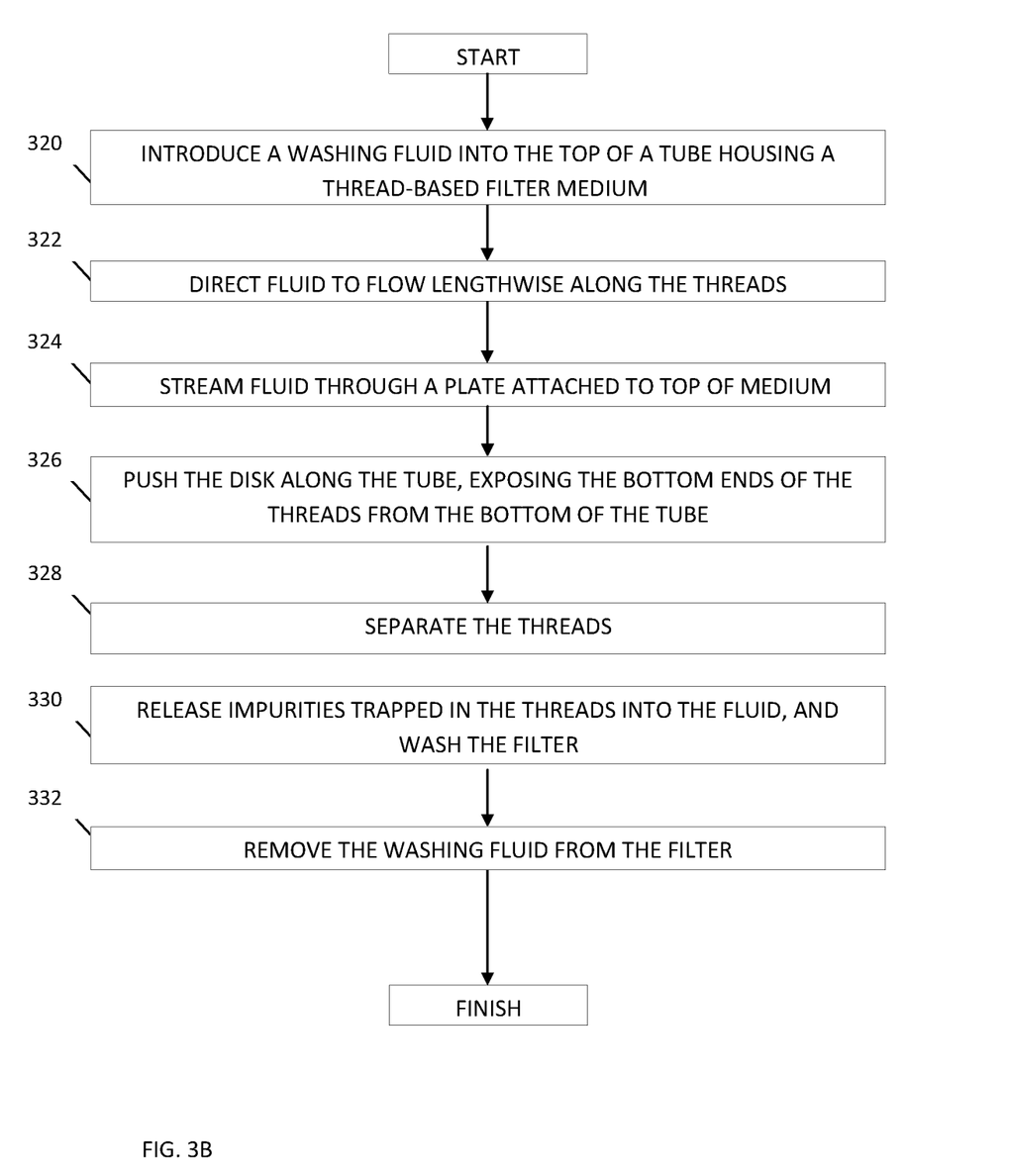
FIG. 3B shows a flowchart of a method for washing a filter, in accordance with the filter of FIG. 1B.

Reference is now made to FIG. 3B which is a simplified flowchart of a method for washing a filter, in accordance with an embodiment of the invention. In the method of FIG. 3B, a washing fluid may be introduced, such as by pumping the fluid in a continuous stream or alternately as a pulse, into the top of a tube at least partially housing a thread-based filter medium comprising multiple threads extending from one end of the medium to the other end (Step 320). The fluid may be directed to flow substantially lengthwise along the threads within the tube (Step 322). The washing fluid may flow through one or more perforation in a plate that is attached to the top of the medium oriented with the top of the tube towards the optionally unattached ends of the threads oriented with the bottom of the tube (Step 324). The washing fluid may push the plate lengthwise along the tube, thereby exposing at least the bottom unattached ends of the thread-based medium from the bottom end of the tube (Step 326). The threads may separate, such as towards their bottom portions, and the inter-thread spacing of the medium may increase (Step 328). Impurities trapped in the threads may be released into the washing fluid (Step 330), thereby washing the filter. The washing fluid may exit from the bottom of the tube and be removed from the medium (Step 332). To enhance the washing, a combination of water and air, or a combination of a different liquid with air, may be used as the washing fluid. The air may form bubbles in the water or the different fluid, and, thereby, the threads and their trapped impurities may be intermittently hit with water and air, shocking them and assisting in releasing the impurities. Alternatively, only air may be used as the washing fluid, for at least a certain duration during the washing.

Figure 4A:
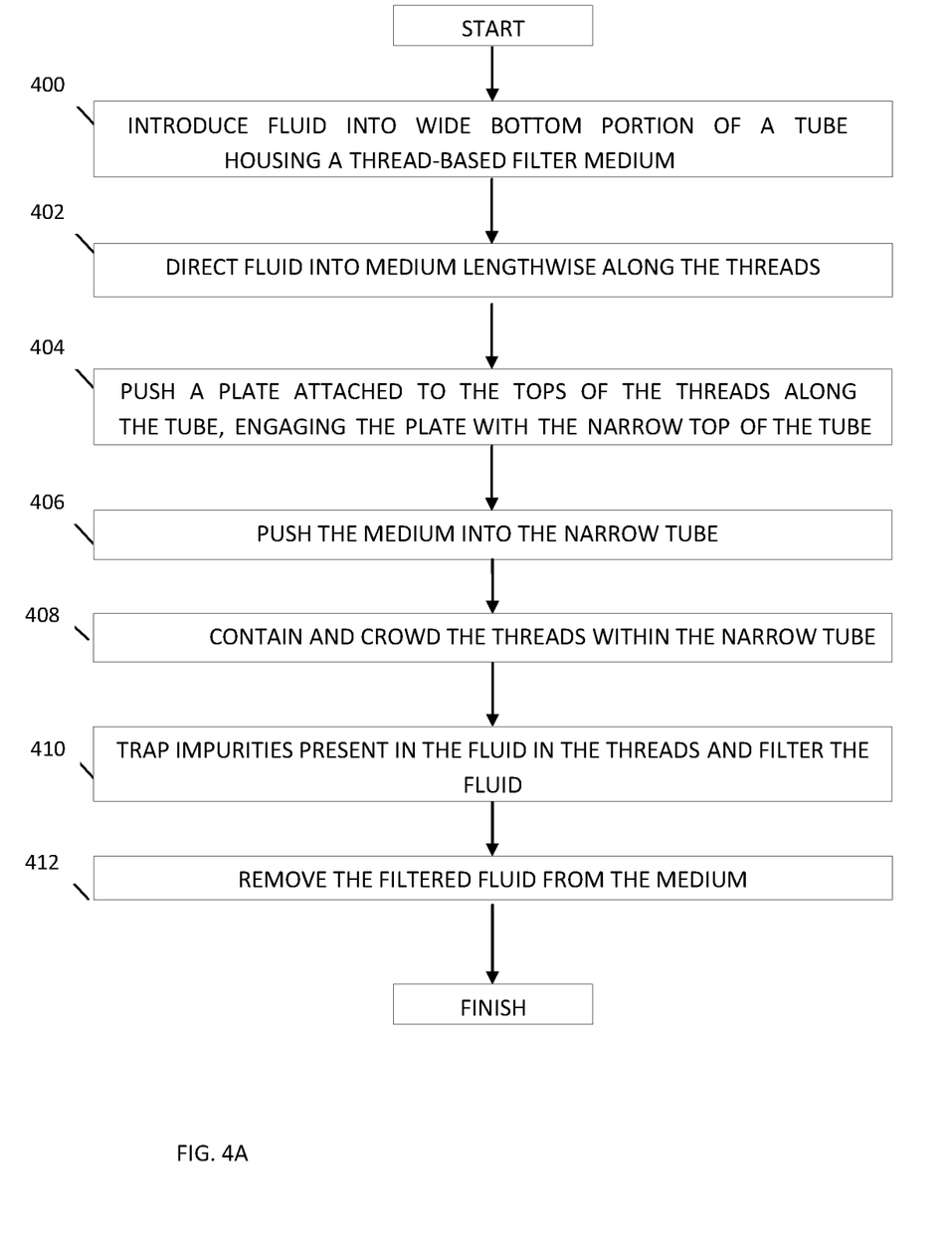
FIG. 4A shows a flowchart of a method for filtering a fluid, in accordance with the filter of FIG. 2A.

Reference is now made to FIG. 4A which is a simplified flowchart of a method for filtering a fluid, in accordance with an embodiment of the invention. In the method of FIG. 4A, a fluid to be filtered may be introduced, such as by pumping the fluid through an opening disposed at the bottom of a wide portion of a tube configured with a varying cross-sectional area along its length and housing a thread-based filtration medium, oriented with the threads running lengthwise along the length of the tube (Step 400). The fluid may be directed into the unattached threads of the medium to flow substantially lengthwise along the threads of the medium towards the attached, optionally tapered ends of the threads (Step 402). The fluid may push a plate attached to the top ends of the threads along the narrow tube portion, engaging the plate with the top of the narrow tube (Step 404). The fluid may push the medium lengthwise along the tube into the narrow tube portion (Step 406). The threads of the medium may be contained within the narrow tube portion, crowding the threads by reducing the inter-thread spacing of the medium (Step 408). Impurities present in the fluid may be trapped in the threads (Step 410), thereby filtering the fluid. The filtered fluid may be removed from the medium by flowing out through one or more perforations in the plate, and exit from the narrow tube portion via an opening (Step 412).

To enhance the washing, a combination of water and air, or a combination of a different liquid with air, may be used as the washing fluid. The air may form bubbles in the water or the different fluid, and, thereby, the threads and their trapped impurities may be intermittently hit with water and air, shocking them and assisting in releasing the impurities. Alternatively, only air may be used as the washing fluid, for at least a certain duration during the washing.

Figure 4B:
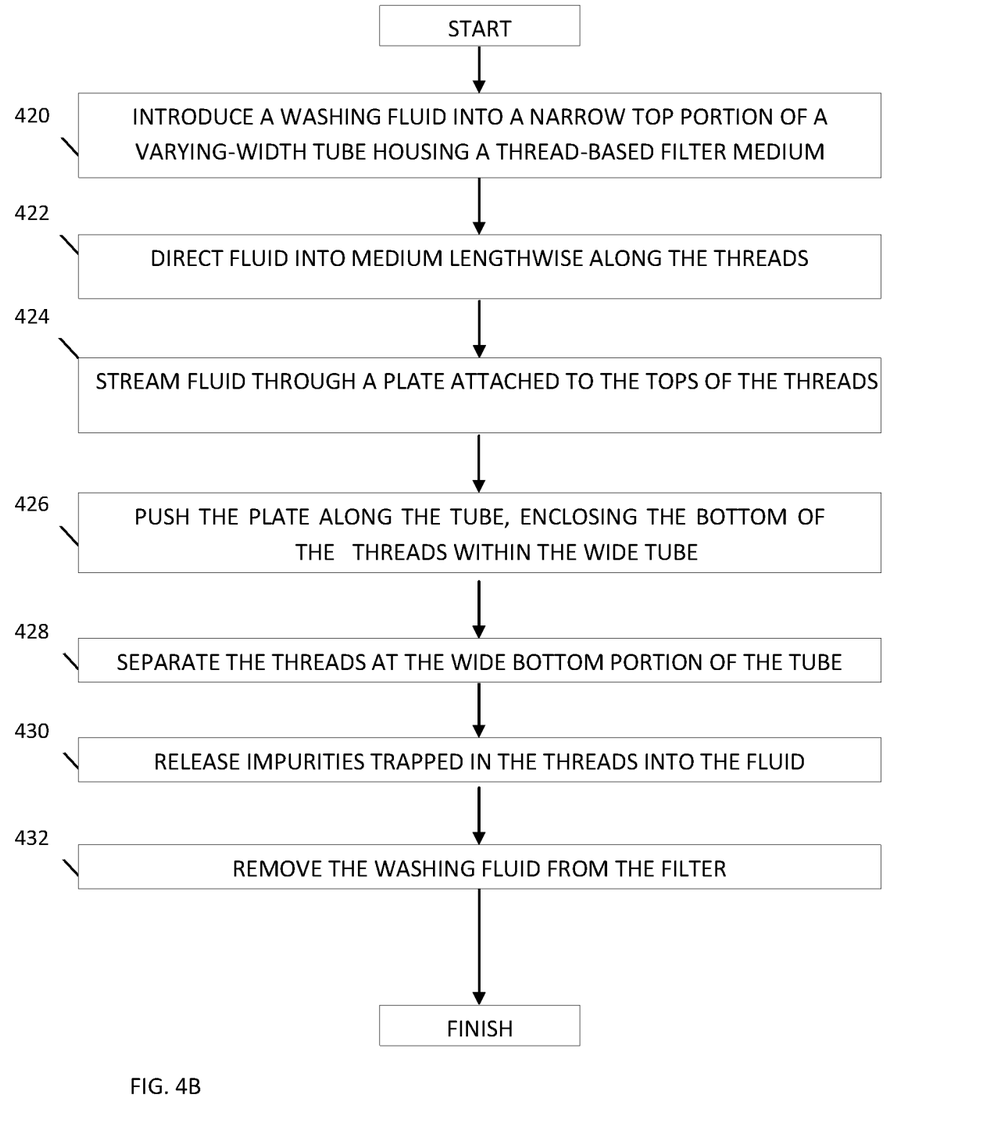
FIG. 4B shows a flowchart of a method for washing a filter, in accordance with the filter of FIG. 2B.

Reference is now made to FIG. 4B which is a simplified flowchart of a method for washing a filter, in accordance with another embodiment of the invention. In the method of FIG. 4A, a washing fluid may be introduced, such as by pumping the washing fluid in a continuous stream or alternately as a pulse, through an opening disposed at the top of a narrow portion of a tube configured with a varying cross-sectional area along its length and housing a thread-based filtration medium oriented with the threads running lengthwise along the length of the tube (Step 420). The washing fluid may be directed to flow substantially lengthwise along the threads of the medium (Step 422). The washing fluid may flow through one or more perforation in a plate that is attached to the top ends of the threads of the medium (Step 424). The washing fluid may push the plate lengthwise along the tube thereby enclosing at least the bottom free ends of the threads within a wide portion of the tube (Step 426). The threads may separate within the wide portion of the tube, thereby increasing the inter-thread spacing of the medium (Step 428). Impurities trapped in the threads may be released into the washing fluid, thereby washing the filter (Step 430). The washing fluid may flow out of the medium through an opening disposed at the bottom of the wide portion of the tube (Step 432).

To enhance the washing, a combination of water and air, or a combination of a different liquid with air, may be used as the washing fluid. The air may form bubbles in the water or the different fluid, and, thereby, the threads and their trapped impurities may be intermittently hit with water and air, shocking them and assisting in releasing the impurities. Alternatively, only air may be used as the washing fluid, for at least a certain duration during the washing.

Figure 5A:
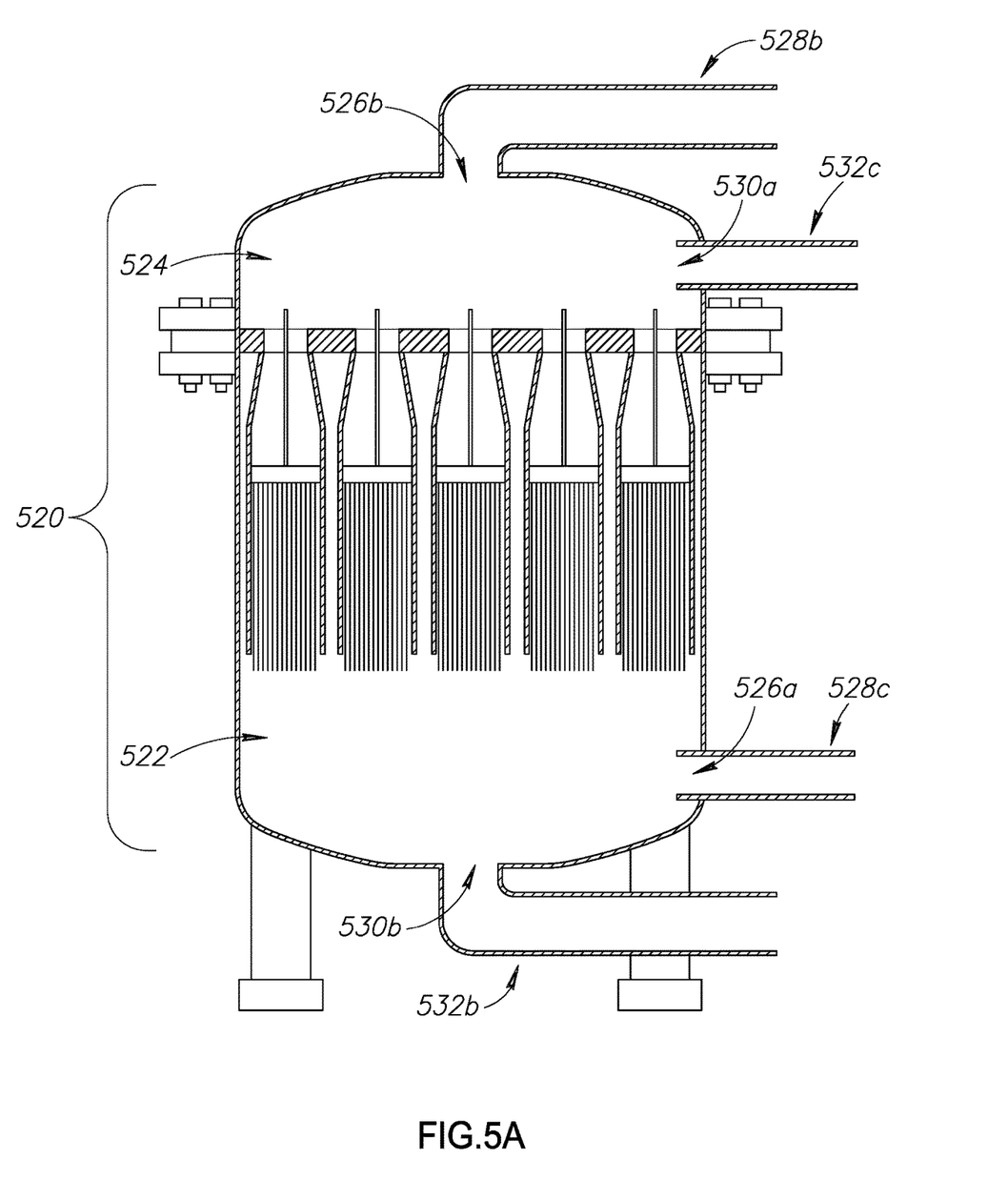
FIGS. 5A-B show a cross-sectional view of an exemplary multi-sheaf-based filter, according to an embodiment of the invention.

Reference is now made to FIG. 5A which shows a cross-sectional view of an exemplary multi-sheaf-based filter, in accordance with another embodiment of the invention. A filter house 520, which may include a filter body 522 attached to a filter cover 524 may house multiple thread-based filter units 500, corresponding to any of filter units 100 or 200, described above. Body 522 may be attached to cover 524 using any suitable attaching technique, such as by using a plurality of screws. Body 522 may be sealed to cover 524, for example using one or more polymeric seals, to prevent fluid leakage. Filter house 520 may provide filtering ports 526*a* and 526*b* coupled to filtering pipes 528*a* and 528*b*, respectively, for introducing and removing fluids from filter units 500 during the filtering mode. Similarly, house 520 may provide washing ports 530*a* and 530*b* coupled to washing pipes 532*a* and 532*b*, respectively, for introducing and removing fluids from filter units 500 during the washing mode. The ports and pipes may be configured to direct fluid flowing in any orientation to flow vertically into and out of units 500.

For example a filtration fluid may be received horizontally into filter house 520 via input filtering port 526*a* disposed towards the bottom of body 522. Input filtering pipe 528*a* may direct the fluid to flow vertically upwards into units 500, so that the fluid flows lengthwise along the threads of mediums 502, corresponding to medium 102, in accordance with the filters described above in FIGS. 1A-B and 2A-B. The fluid may be removed by exiting from units 500 via output filtering pipe 528*b* in a substantially vertical orientation and be directed to flow horizontally out of filter house 520 via output filtering port 526*b* disposed at the side of cover 524, thereby filtering the filtration fluid.

Similarly, a washing fluid may be introduced horizontally into filter house 520 via input washing port 530*a* situated at the side of cover 524. Input washing pipe 532*a* may direct the fluid to flow vertically downwards into units 500, so that the fluid flows lengthwise along the threads of mediums 502, corresponding to medium 102, in accordance with the filters described above in FIGS. 1A-B and 2A-B. The washing fluid may exit from units 500 via output washing pipe 532*b* in a substantially vertical orientation and be directed to flow horizontally out of filter house 520 via output washing port 526*b* disposed towards the bottom of body 524.

Figure 5B:
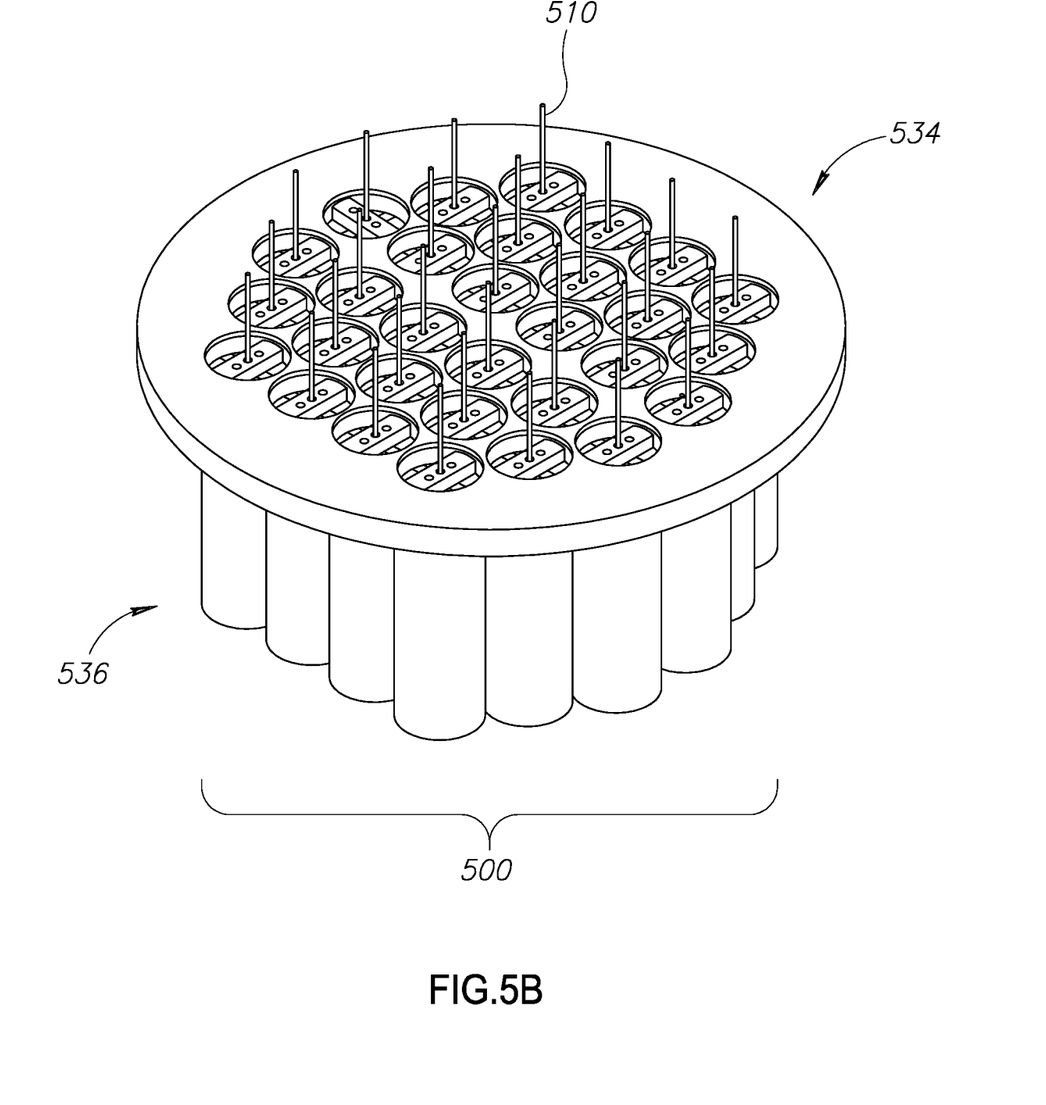

Reference is now made to FIG. 5B which shows another cross-sectional view of the multi-sheaf-based filter of FIG. 5A, in accordance with an embodiment of the invention. Filter house 520 may encase a sheaf house 534 that is disposed with multiple receptacles 536 for containing the multiple thread-based filter units 500, thereby disposing units 500 for the filtering and washing modes described above. Units 500 may be individually inserted into receptacles 536 and positioned vertically in sheaf house 534 by inserting rods 510, corresponding to rods 510 above, through supporting crossbars 538. In one embodiment, the sheaf house may contain up to 50 sheaf-based filtering units. In other embodiments, the sheaf house may contain 50 or more sheaf-based filtering units.

Figure 6A:
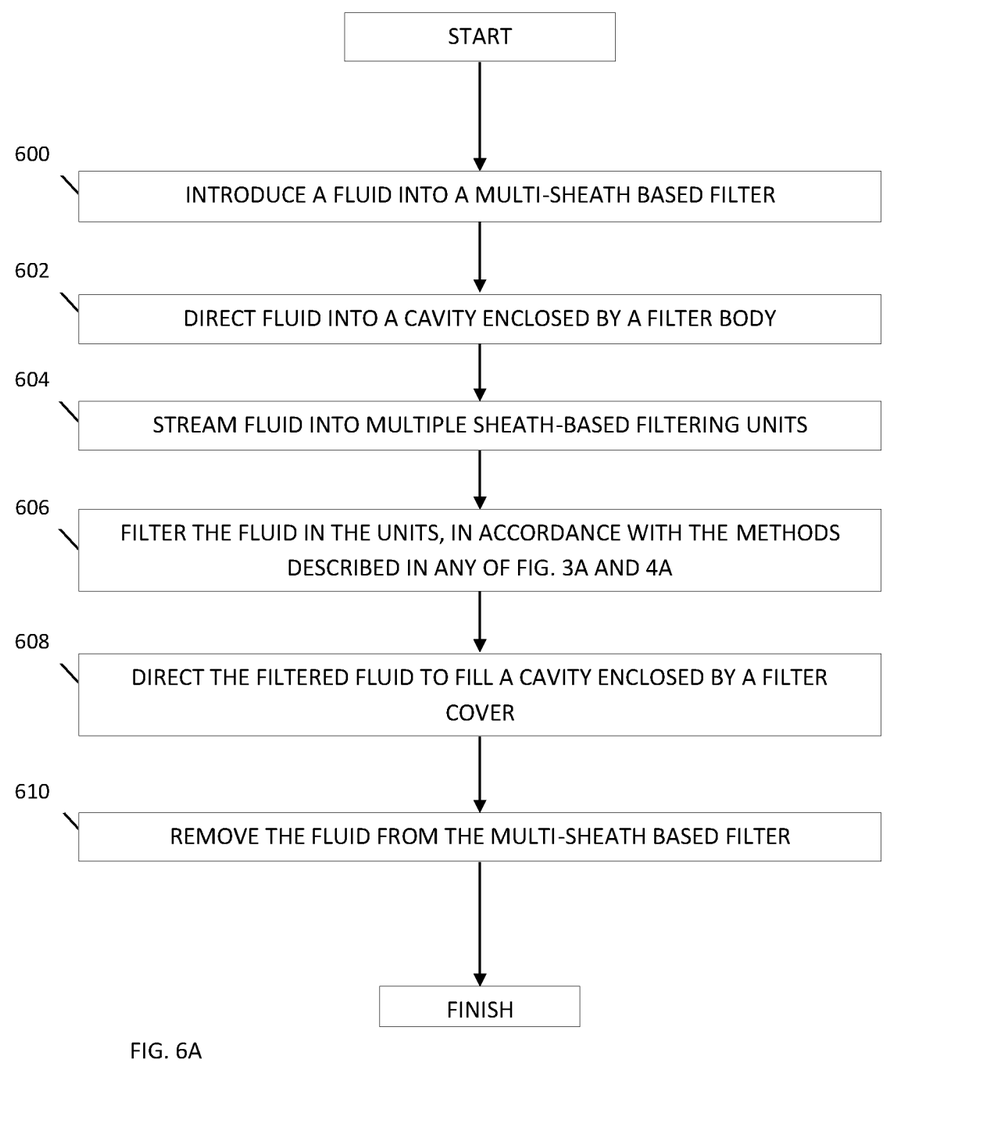
FIG. 6A shows a flowchart of a method for filtering a fluid, in accordance with the filter of FIGS. 5A-B.

Reference is now made to FIG. 6A which is a simplified flowchart of a method for filtering a fluid using a multi-sheath-based filter, in accordance with an embodiment of the invention. In the method of FIG. 6A, a filtering fluid may be introduced at the bottom of a multi-sheath-based filter (Step 600). The fluid may be directed into a sealed body, optionally filling a cavity enclosed by the body, where the body contains multiple sheath-based filtering units corresponding to any of units 100 and 200 described above (Step 602). The fluid may flow into the sheath-based filtering units. In some embodiments the fluid may be streamed into the multiple filtering units simultaneously. In other embodiments, the fluid may be streamed into the units sequentially (Step 604). The fluid may be filtered in accordance with the methods described above and in any of FIGS. 3A and 4A (Step 606). The filtered fluid may be removed from the units and directed into a sealed cover, optionally filling a cavity enclosed by the cover (Step 608). The filtered fluid may be directed out of the sealed cover, and removed from the multi-sheath-based filter (Step 610).

Figure 6B:
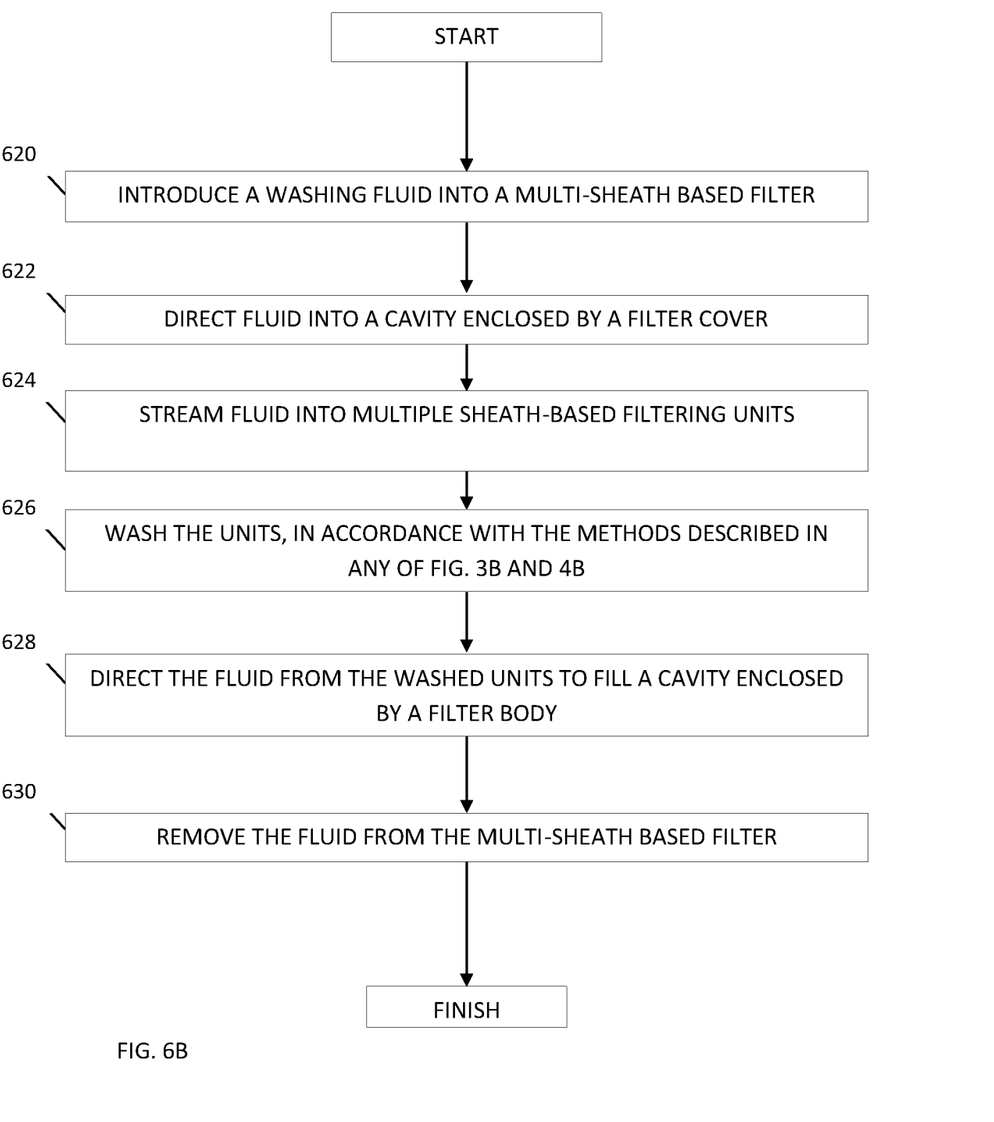
FIG. 6B shows a flowchart of a method for washing a filter, in accordance with the filter of FIGS. 5A-B.

Reference is now made to FIG. 6B which is a simplified flowchart of a method for washing a multi-sheath-based filter, in accordance with an embodiment of the invention. In the method of FIG. 6B, a washing fluid is introduced at the top of a multi-sheath-based filter (Step 620). The fluid may be directed into a sealed cover, optionally filling a cavity enclosed by the cover (Step 622). The fluid may flow into multiple filtering units, corresponding any of units 100 and 200. In some embodiments the fluid may be streamed into the multiple filtering units simultaneously. In other embodiments, the fluid may be streamed into the units sequentially (Step 624). The filtering may be washed in accordance with the method described above and in any of FIGS. 3B and 4B (Step 626). The washing fluid may be directed out the units into a sealed body, optionally filling a cavity enclosed by the body (Step 628). The washing fluid may be directed out of the sealed body, and removed from the multi-sheath-based filter (Step 630).

To enhance the washing, a combination of water and air, or a combination of a different liquid with air, may be used as the washing fluid. The air may form bubbles in the water or the different fluid, and, thereby, the threads and their trapped impurities may be intermittently hit with water and air, shocking them and assisting in releasing the impurities. Alternatively, only air may be used as the washing fluid, for at least a certain duration during the washing.

In this manner, a high overall thread-count is provided for enhanced filtration. By dividing and separating the threads into multiple tubes individually contained in multiple receptacles, a degree of separation is maintained between the threads, hindering thread entanglement.

In the description and claims of the application, each of the words "comprise" "include" and "have", and forms thereof, are not necessarily limited to members in a list with which the words may be associated. In addition, where there are inconsistencies between this application and any document incorporated by reference, it is hereby intended that the present application controls.

What is claimed is:

1. A method for using a filter, the method comprising:
introducing a fluid to be filtered into a thread-based filtration medium comprising multiple threads extending between a first end and a second end of the medium, wherein:
the medium is at least partially housed in a tube,
the threads of the medium are oriented lengthwise along the length of the tube with the first end of the medium oriented with a first end of the tube and the second end of the medium oriented with a second end of the tube,
the threads at the second end of the medium are attached to a plate that provides one or more passageways for fluid, and the threads at the first end of the medium are unattached and exposed,
the plate is coupled to a rod which provides a stabilizing axis for lengthwise motion of the plate inside the tube;
directing the filtering fluid to flow lengthwise along the threads, from the first end of the medium to the second end of the medium, thereby:
pushing the plate and the medium towards the second end of the tube, decreasing an inter-thread spacing of the medium at least in an area adjacent the second end of the medium, and trapping in the threads impurities present in the fluid, thereby filtering the fluid;

removing the filtered fluid from the second end of the medium;

introducing a washing fluid into the second end of the thread-based medium;

directing the washing fluid to flow lengthwise along the threads from the second end of the medium to the first end of the medium, thereby:

pushing the plate and the medium towards the first end of the tube, increasing the inter-thread spacing of the medium at least in an area adjacent the first end of the medium, by: (a) exposing at least said area of the medium from the first end of the tube, or (b) exposing at least said area of the medium from a narrow portion of the tube to a wide portion of the tube, and releasing the impurities trapped in the threads into the washing fluid, thereby washing the medium; and removing the washing fluid and the released impurities from the first end of the tube.

2. The method of claim 1, wherein the plate comprises a peripheral seal that prevents leakage between the tube and the plate.

3. The method of claim 1, wherein the washing fluid is introduced in a continuous stream.

4. The method of claim 1, wherein the washing fluid is introduced in pulses.

5. The method of claim 1, wherein the washing fluid comprises water.

6. The method of claim 1, wherein the washing fluid comprises air.

7. The method of claim 1, wherein the washing fluid comprises a combination of water and air, to form bubbles that shock the medium and assist in the releasing of the impurities.

8. The method of claim 1, wherein the lengthwise motion of the plate inside the tube is solely by a pressure of the fluid to be filtered and the washing fluid.

9. The method of claim 1, wherein the multiple threads of the medium are each a monofilament fiber.

10. The method of claim 9, wherein each of the monofilament fibers has a diameter of 200 to 250 micrometers.

11. The method of claim 1, wherein the multiple threads of the medium are each a spun thread that is composed of multiple monofilament fibers.

12. The method of claim 11, wherein each of the multiple monofilament fibers is made of polyester.

13. The method of claim 12, wherein each of the spun threads has a diameter of 200 to 250 micrometers.

* * * * *